United States Patent
Nitz et al.

(10) Patent No.: US 10,352,793 B2
(45) Date of Patent: Jul. 16, 2019

(54) TORQUE SENSOR AND METHOD FOR DETECTING TORQUES OCCURRING ON OR IN A JOINT OF AN ARTICULATED ARM ROBOT

(71) Applicant: KUKA Roboter GmbH, Augsburg (DE)

(72) Inventors: Gernot Nitz, Augsburg (DE); Dietmar Tscharnuter, Friedberg (DE)

(73) Assignee: KUKA Roboter GmbH, Augsburg (DE)

(*) Notice: Subject to any disclaimer, the term of this patent is extended or adjusted under 35 U.S.C. 154(b) by 0 days.

(21) Appl. No.: 15/312,119

(22) PCT Filed: Jun. 1, 2015

(86) PCT No.: PCT/EP2015/062128
§ 371 (c)(1),
(2) Date: Nov. 17, 2016

(87) PCT Pub. No.: WO2015/185494
PCT Pub. Date: Dec. 10, 2015

(65) Prior Publication Data
US 2017/0153156 A1 Jun. 1, 2017

(30) Foreign Application Priority Data
Jun. 2, 2014 (DE) .................. 10 2014 210 379

(51) Int. Cl.
*G01L 3/10* (2006.01)
*G01L 5/22* (2006.01)
(Continued)

(52) U.S. Cl.
CPC ............ *G01L 3/108* (2013.01); *B25J 13/085* (2013.01); *G01L 5/16* (2013.01); *G01L 5/22* (2013.01);
(Continued)

(58) Field of Classification Search
CPC ....... G01L 3/1457; G01L 5/161; G01L 3/108; G01L 5/226; G01L 5/16; G01L 1/22; G01L 1/20; B25J 13/085
(Continued)

(56) References Cited

U.S. PATENT DOCUMENTS 3,693,425 A * 9/1972 Starita .................. G01L 1/2262
                                                              73/514.02
4,448,083 A * 5/1984 Hayashi ................. G01L 5/161
                                                              73/862.042
(Continued)

FOREIGN PATENT DOCUMENTS

CN  202533206     * 11/2012
CN  202533206 U    11/2012
(Continued)

OTHER PUBLICATIONS

Examination Report from GPTO in DE Appl. No. 10 2014 210 379.7, dated Jul. 22, 2015.
(Continued)

*Primary Examiner* — Jonathan M Dunlap
*Assistant Examiner* — Octavia Hollington

(57) ABSTRACT

A torque sensor (10), in particular for detecting torques occurring on or in a joint of an articulated-arm robot. The sensor has several measuring spokes (1, 2, 3, 4) that are designed to deform under the effects of torque; and several strain gauges (DR11, DR12, DR21, DR22, DR31, DR32, DR41, DR42), with two strain gauges being arranged on two opposite sides of the several measuring spokes (1, 2, 3, 4). The several strain gauges are each connected in one of at least two bridge circuits (A, B). The at least two bridge circuits (A, B) are each configured to generate a bridge voltage ($U_a$, $U_b$). By detecting and comparing differences in the bridge voltage signals ($U_a$, $U_b$) generated by the at least
(Continued)

two bridge circuits (A, B); a reliability of the detected bridge voltage signals is determined.

10 Claims, 3 Drawing Sheets

(51) Int. Cl.
*G01L 5/16* (2006.01)
*B25J 13/08* (2006.01)

(52) U.S. Cl.
CPC .... *G01L 5/226* (2013.01); *G05B 2219/39529* (2013.01)

(58) Field of Classification Search
USPC .............. 73/862.331–862.338, 862.325
See application file for complete search history.

(56) References Cited

U.S. PATENT DOCUMENTS

| | | | | | |
|---|---|---|---|---|---|
| 4,573,362 | A | * | 3/1986 | Amlani | G01L 1/2218 73/862.044 |
| 4,672,855 | A | * | 6/1987 | Schmieder | G01L 5/161 73/862.041 |
| 4,763,531 | A | * | 8/1988 | Dietrich | G01L 5/161 73/862.044 |
| 7,743,672 | B2 | * | 6/2010 | Kurtz | G01L 3/1457 73/862.041 |
| 8,649,906 | B2 | * | 2/2014 | Bischoff | B25J 13/085 700/258 |
| 8,776,616 | B2 | * | 7/2014 | Szasz | G01L 5/161 73/862.044 |
| 9,448,128 | B2 | * | 9/2016 | Kim | G01L 5/161 |

FOREIGN PATENT DOCUMENTS

| | | |
|---|---|---|
| DE | 281727 | 8/1990 |
| DE | 281727 A7 | 8/1990 |
| DE | 4012829 | 10/1991 |
| EP | 0168998 | 1/1986 |
| EP | 0575634 | 12/1993 |
| EP | 1688725 | 8/2006 |
| WO | 2010066296 | 6/2010 |
| WO | WO2010066296 A1 * | 6/2010 |
| WO | 2010088922 | 8/2010 |
| WO | WO2013169056 * | 11/2013 |

OTHER PUBLICATIONS

The International Search Report and Written Opinion, dated Sep. 23, 2015, in the corresponding PCT Appl. No. PCT/EP2015/062128.
The English translation of the first examination report, dated Jan. 31, 2018, in the related European patent application No. 15 727 367.3.
The English translation of the Korean Office Action, dated Jun. 19, 2018, in the related Korean patent application No. 10-2016-7033568.
The English translation of the Chinese Office Action, dated Jun. 29, 2018, in the related Chinese patent application No. 2015800293433.

* cited by examiner

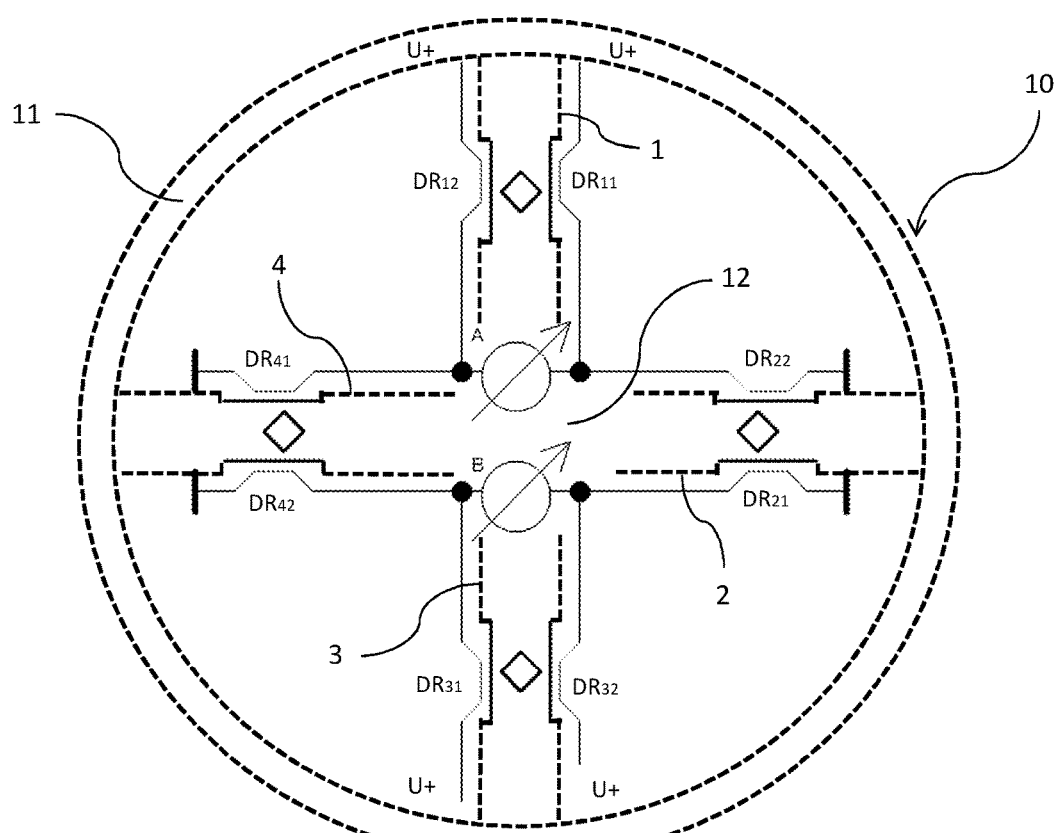
Figure 1a
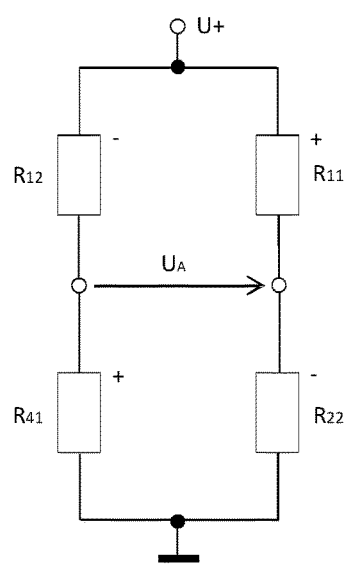
Figure 1b
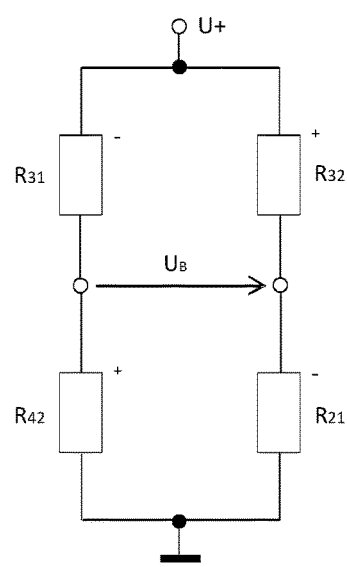
Figure 1c
Figure 1

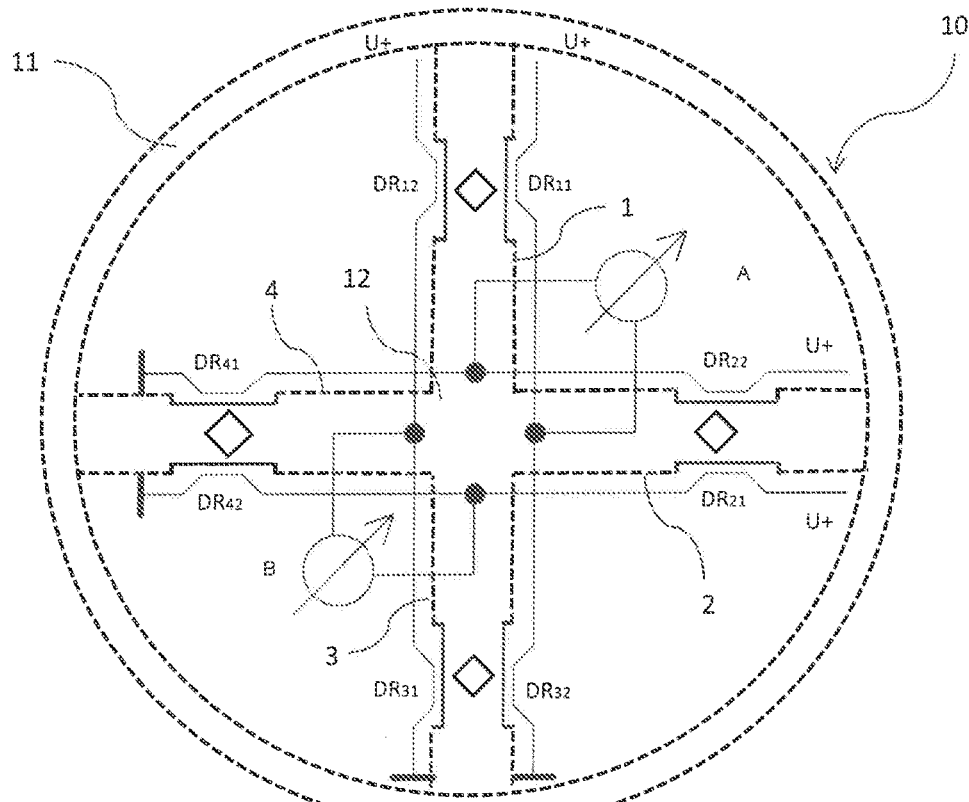
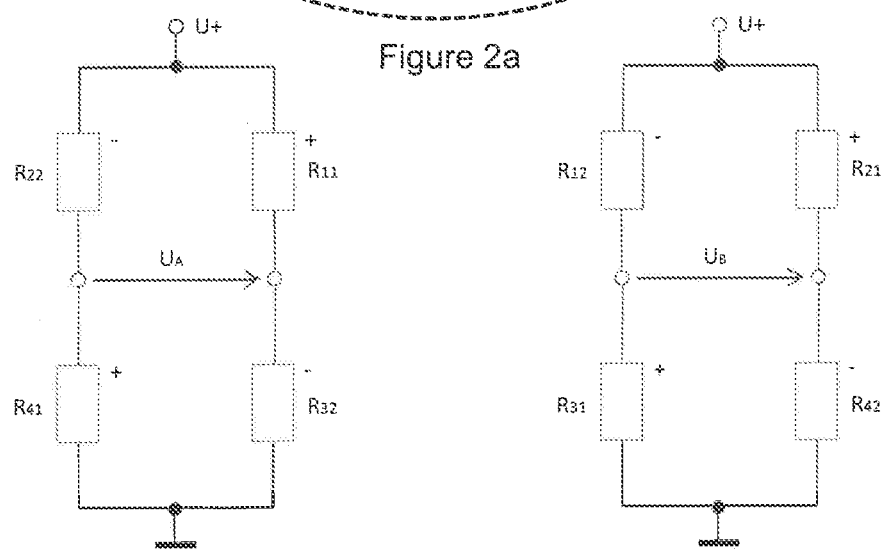
Figure 2b       Figure 2c
Figure 2

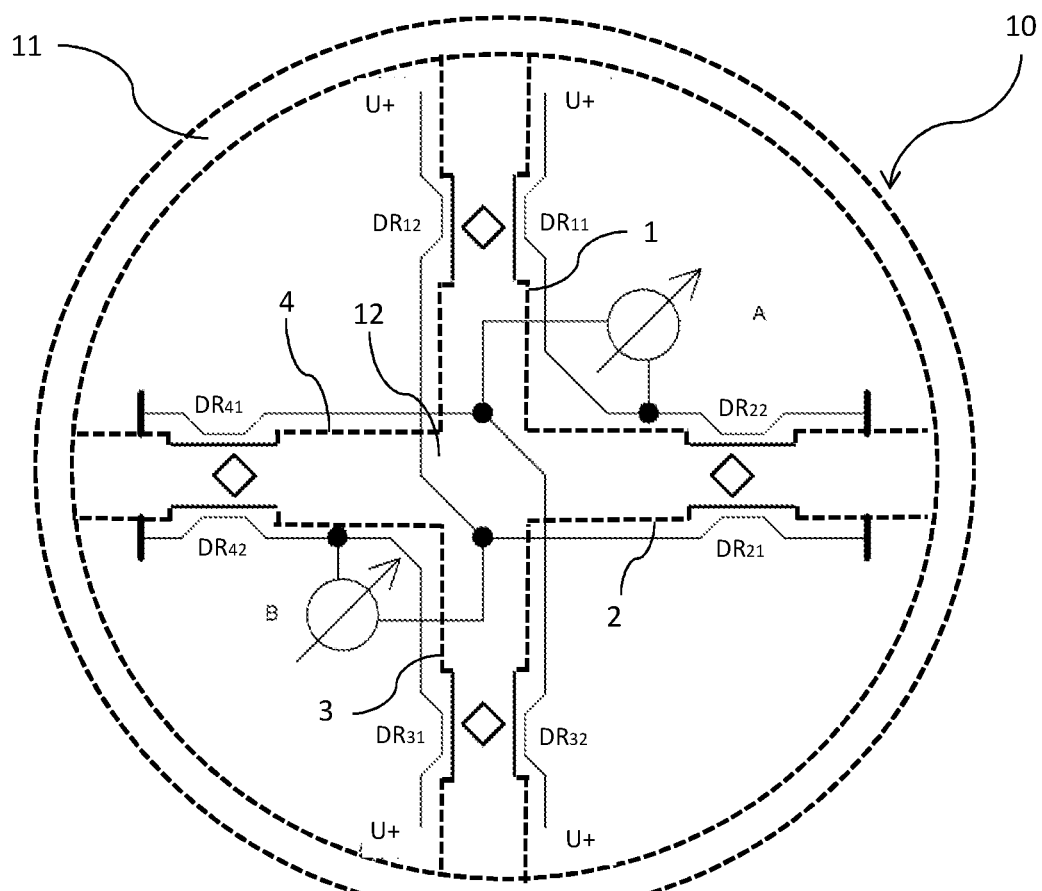
Figure 3a
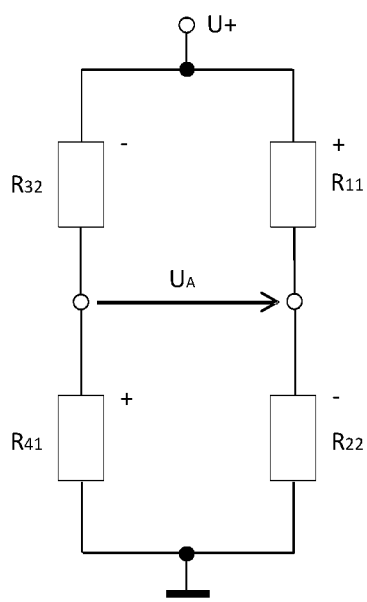
Figure 3b
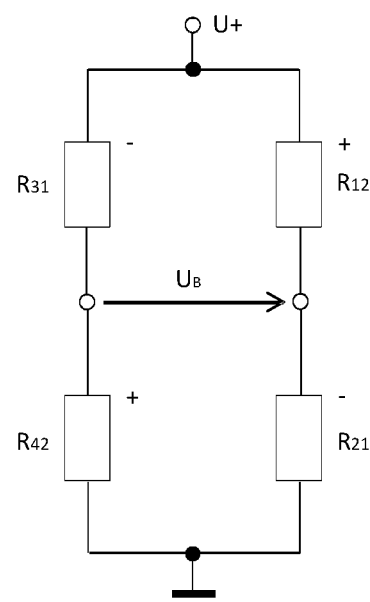
Figure 3c
Figure 3

TORQUE SENSOR AND METHOD FOR DETECTING TORQUES OCCURRING ON OR IN A JOINT OF AN ARTICULATED ARM ROBOT

CROSS-REFERENCE TO RELATED APPLICATIONS

This application is a National Stage Application of PCT/EP2015/062128 filed Jun. 1, 2015, which claims priority from German Patent Application No. 10 2014 210 379.7 filed Jun. 2, 2014. Each of the prior mentioned applications is hereby incorporated by reference herein in its entirety.

1. FIELD OF THE INVENTION

The present invention relates to a sensor for detecting torques, in particular torques occurring on or in a joint of an articulated-arm robot, and a corresponding method and a thus equipped robot.

2. BACKGROUND

Robots, such as articulated-arm robots, for example, which can be used in various industrial fields, have, dependent on the intended field of application, several links which can be moved by means of joints, which links may be arranged in different ways. An important component of these robots are torque sensors for detecting the torques of the movable links. In most cases, these torque sensors are installed in or on all movable links of the robot.

The prior art has provided various systems for the detection of torques. WO 2009/083111, for example, describes a system for torque detection which uses strain gauges. These strain gauges are connected in two Wheatstone bridges (Wheatstone measuring bridge or bridge circuit) for the purpose of evaluation. The resistors of two strain gauges are arranged on two different locations of a component connected to the movable link and are each connected to form a half bridge. These two half bridges each form a bridge circuit. Another bridge circuit is formed by the resistors of two additional strain gauges, which are arranged on two additional different locations of the component. Thanks to the redundant design of the strain gauges, two torque values are detected. In order to ensure the functionality, a comparing means compares the signals of the same torque emitted by the two bridge circuits and shuts down the robot if the two signals differ beyond a certain tolerance range.

The systems and methods for torque detection known in the prior art nevertheless have the disadvantage that a deformation of the strain gauge apart from the torque load, which can be caused, for example, by compression of the strain gauge due to transverse forces, axial forces and bending moments, can lead to different signals even though no error is present. Different signals result in a measuring inaccuracy and this variance can, if a certain limit value is exceeded, lead to an emergency shutdown of the robot without there being any cause for doing so.

The problem addressed by the present invention is therefore to provide a sensor and a corresponding method which allow the above-mentioned disadvantages to be avoided and with which more precise and less error-prone detection of torques is possible. Another problem addressed is to provide a robot which is improved accordingly.

3. DETAILED DESCRIPTION OF THE INVENTION

The torque sensor according to the invention, which serves in particular to detect torques occurring on or in a joint of an articulated-arm robot, has several measuring spokes that are designed to deform under the effects of torque.

A torque sensor of this type is described in DE 36 05 964 A1 and comprises, e.g., a spoked wheel with an outer ring, an inner ring or hub, and several flexurally elastic spokes (measuring spokes), which connect the outer ring and the hub. The measuring spokes are stretched on one side in the event of a torque load and compressed on the side opposite the same measuring spoke. As is shown in DE 36 05 964 A1, a torque sensor can, for example, consist of a central hub part and an outer edge, which are connected to one another by means of four measuring spokes offset by 90° (i.e., the measuring spokes are arranged at the same angle about the hub). However, it is also possible, for example, to use more or fewer measuring spokes.

In accordance with the invention, the torque sensor has several strain gauges.

Two strain gauges are arranged at or on two opposite sides of a measuring spoke in such a way that one side of the measuring spoke is stretched under the effects of the torque, while the opposite side is compressed.

By means of a shape change of the measuring spokes the torque can be determined with the aid of the strain gauges. Strain gauges advantageously change their resistance value even in the case of a small strain or compression. These strain gauges can, for example, be stuck onto the measuring spokes, in order to thus be able to deform together with the measuring spokes. The strain gauge consists, for example, of a meander-shaped arrangement of a resistance wire. The arrangement can also consist of semiconductors, so that a volume change of the arrangement brings about a change in the specific resistance of the strain gauge.

According to the invention, the several strain gauges are each connected in one of at least two bridge circuits. These bridge circuits are preferably designed as a Wheatstone bridge circuit, which consists of two parallel voltage dividers, so that each voltage divider forms a half bridge. The voltage dividers are each formed by two resistors arranged in series. The output signal of the bridge circuit is referred to as bridge voltage. The bridge voltage is the voltage difference measured between the two voltage dividers in the bridge circuit. Because the measuring points for the measurement of the bridge voltage are each located between the two resistors in the two voltage dividers, the bridge voltage is often also referred to as transverse voltage. The tap is ideally located exactly between the two resistors in the voltage dividers. If all resistors have the same value, for example, the bridge is considered to be balanced. This means that the voltage difference between the two voltage dividers is 0 V. If the resistors in the individual voltage dividers change differently, the bridge is not considered to be balanced and a bridge voltage can be measured.

The strain gauges form variable resistors in the bridge circuit. The resistance changes of adjacent strain gauges of a bridge circuit effect the bridge voltage in opposite ways. Similarly, the resistance changes of opposite strain gauges effect the bridge voltage in the same way.

In accordance with the invention, in each of the at least two bridge circuits, at least three strain gauges are arranged on different measuring spokes. The bridge circuit is preferably a full bridge. For reasons of security, the torque measurement is carried out by means of two bridge circuits. Each bridge circuit thus provides a signal by means of which the current torque can be determined. If both signals are identical, errors in the measurement system can be ruled out.

In the context of the invention, it was somewhat surprisingly determined that the torque can be determined particularly reliably if strain gauges, which are arranged on a measuring spoke, are connected in different bridge circuits. Interfering influences which cause deformations are thus advantageously compensated by the different strain gauges in the bridge circuit, with at least one being compressed and at least one other being stretched. The interfering influences are thus not observable in the measurement voltage. According to the invention, each of the at least two bridge circuits therefore has at least three strain gauges, which are arranged on different measuring spokes of the torque sensor. The comparison of the bridge voltages can therefore take place within a small tolerance range.

In one preferred embodiment, each of the at least two bridge circuits has a bridge voltage and a reliable signal is formed from a cross-comparison of the bridge voltages of the two bridge circuits. This reliable signal indicates that the two bridge circuits, which each provide a torque signal independently of each other, are functioning in an error-free manner. The cross-comparison is comprised of a direct comparison of the two bridge voltages. This advantageously permits an efficient control of the functioning of both redundant signals, in order to thus be able to detect an error in the case of a difference in the signals that exceeds a defined tolerance. In practice, this comparison can be realized, for example, by a difference formation of the two signals. Alternatively, if a bridge circuit is adapted to supply a positive voltage and the other bridge is adapted to supply a negative voltage, this can also occur by means of adding the two signals. The result of the comparison should normally be 0 V.

In one preferred embodiment, all four strain gauges, which are connected in each bridge circuit, are arranged on different spokes of the torque sensor. A deformation of the measuring spokes apart from the torque load, by means of compression of the measuring spokes as was described above and transverse forces, axial forces and bending moments acting on the inner measuring hub, can thus advantageously be compensated because strain gauges on each measuring spoke are connected in each bridge circuit.

In another preferred embodiment, two strain gauges on adjacent measuring spokes are connected in a first half bridge and two strain gauges on other adjacent measuring spokes are connected in a second half bridge.

It is thus ensured that one strain gauge is located on all four measuring spokes. Such a distribution also advantageously allows all four strain gauges in each bridge circuit to be arranged on different measuring spokes of the torque sensor.

In one embodiment, two strain gauges on opposite measuring spokes are each connected to form a half bridge and two strain gauges on other opposite measuring spokes are each connected to form a second half bridge. This embodiment, alternatively to the previous embodiment, also ensures a uniform distribution of four strain gauges in each bridge circuit on different spokes of the torque sensor.

In another embodiment, two strain gauges on adjacent measuring spokes are connected in a first half bridge and two strain gauges on adjacent measuring spokes are connected in a second half bridge, with one strain gauge of the first half bridge and one strain gauge of the second half bridge being arranged on the same measuring spoke and the two other strain gauges being arranged on measuring spokes different from this measuring spoke.

It is generally preferred that the torque sensor comprises a spoked wheel with an outer ring, an inner ring or hub, and several flexurally elastic measuring spokes, which connect the outer ring and the hub. The outer ring and the inner ring can have any suitable geometry, for example, they may both be circular or square. The torque sensor preferably has exactly three or exactly four measuring spokes, which are arranged at the same angle about the inner ring or the hub, i.e., offset by 90° in the case of four spokes and offset by 120° in the case of three spokes.

The method according to the invention for detecting torques with a torque sensor, in particular torques occurring on or in a joint of an articulated-arm robot, comprises the following steps:

Firstly, a torque is measured with the aid of strain gauges on several measuring spokes of a torque sensor, as has been described above, and with two strain gauges being arranged on opposite sides of one of the several measuring spokes.

The signals provided by the strain gauges are then evaluated with the aid of at least two bridge circuits, with at least three strain gauges, which are arranged on different measuring spokes, being connected in each of the at least two bridge circuits.

The invention additionally relates to an articulated-arm robot with at least one robot arm, which is arranged mobile thanks to a joint on another component of the robot, and which uses the above-described torque sensor, to allow particularly reliable and precise operation. The torque sensor designed according to the invention is for this purpose arranged in a manner known per se on or in the joint.

4. DESCRIPTION OF PREFERRED EMBODIMENTS

The sensor according to the invention for detecting torques, in particular torques occurring on or in a joint of an articulated-arm robot, and a corresponding method and a thus equipped robot are explained in detail below by way of an example with reference to the exemplary embodiments shown in the figures below, in which:

FIG. 1a: shows a view of a schematic depiction of measuring spokes with strain gauges arranged thereon according to a first embodiment, FIG. 1b, FIG. 1c: show the connection of the resistors of the strain gauges in two bridge circuits according to the first embodiment shown in FIG. 1a, FIG. 2a: shows a view of a schematic depiction of measuring spokes with strain gauges arranged thereon according to a second embodiment, FIG. 2b, FIG. 2c: show the connection of the resistors of the strain gauges in two bridge circuits according to the second embodiment shown in FIG. 2a, FIG. 3a: shows a view of a schematic depiction of measuring spokes with strain gauges arranged thereon according to a third embodiment, and FIG. 3b, FIG. 3c: show the connection of the resistors of the strain gauges in two bridge circuits according to the third embodiment shown in FIG. 3a.

FIGS. 1a, 2a, 3a each show a view of a schematic depiction of four spokes (measuring spokes) 1, 2, 3, 4 with strain gauges DR11, DR12, DR21, DR22, DR31, DR32, DR41, DR42 arranged thereon, with the strain gauges being connected to form two bridge circuits. The measuring spokes form part of a torque sensor 10 which, in the depicted embodiment, has an outer ring 11 and an inner ring or hub (measuring hub) 12, which are connected via the measuring spokes. The spatial design of the torque sensor 10 is merely schematically indicated by the dashed lines in the figures because its precise design is not relevant to the present invention. Furthermore, a person skilled in the art is familiar with the basic structure of such torque sensors, from the previously mentioned DE 36 05 964 A1, for example, so that a detailed description is not provided here. The figures additionally show measuring devices A, B for determination of the bridge voltages in the respective bridge circuits. In the depicted embodiments, a bridge circuit is adapted to supply a positive voltage and the other bridge circuit is adapted to supply a negative voltage, so that the result of the comparison of the two bridge voltages is normally 0 V. Alternatively, both bridge circuits can also supply a positive voltage or both can supply a negative voltage.

In the embodiments shown in FIGS. 1a, 2a, 3a, four measuring spokes 1, 2, 3, 4 are provided. In these embodiments, the measuring spokes are each offset by approx. 90°, i.e., at the same angle about the hub 12. The measuring spokes 1, 2, 3, 4 deform elastically during operation due to the effects of an external stress, for example a torque. In the embodiments shown in FIGS. 1a, 2a, 3a, openings can also be located in the measuring spokes, which serve to create a deformation zone.

The stress can, for example, be introduced via the outer ring 11, with the hub 12 being fixed, or vice versa. Depending on the load applied, the measuring spokes deform to different extents. In the present exemplary embodiments, strain gauges DR11, DR12, DR21, DR22, DR31, DR32, DR41, DR42 are used. These are fixed on the measuring spokes, for example by means of an adhesive connection, so that the strain gauges DR11, DR12, DR21, DR22, DR31, DR32, DR41, DR42 deform in a similar way to/with the measuring spokes 1, 2, 3, 4. The strain gauges indicate this deformation as a change of their electrical resistance R11, R12, R21, R22, R31, R32, R41, R42. The strain gauges usually consist of resistance wire, which is located on a thin support element made of plastic, for example. The nominal resistance, in other words, the resistance of the strain gauge without load, is typically between 100Ω and 1000Ω.

In the shown embodiments, two strain gauges are mounted on opposite sides of a measuring spoke. For example, strain gauge DR12 is arranged on measuring spoke 1 on one side of the measuring spoke, while strain gauge DR11 is arranged on the opposite side of the measuring spoke. A strain gauge is thus stretched on the one measuring spoke side in the case of a torque, whereas the strain gauge on the opposite measuring spoke side is compressed. This opposing compression/stretching also results in an opposing change in the respective resistance value. For the sake of better understanding, the effects of the resistance changes on the measurement voltage in the case of compression/stretching are shown in the figures with +/− in the respective circuits.

In the first embodiment shown in FIG. 1a, for a bridge circuit, the strain gauges DR11, DR22 on adjacent measuring spokes 1, 2 are connected in a first half bridge and the strain gauges DR12, DR41 on adjacent measuring spokes 1, 4 are connected in a second half bridge, with one strain gauge DR11 of the first half bridge and one strain gauge DR12 of the second half bridge being arranged on the same measuring spoke 1 and the two other strain gauges DR22, DR41 being arranged on measuring spokes 2, 4 different from this measuring spoke.

In FIGS. 1b and 1c, the connection of the resistors of the strain gauges in the bridge circuits is depicted in accordance with the first embodiment shown in FIG. 1a.

FIG. 1b shows the first bridge circuit, which supplies the first bridge voltage $U_A$ for a cross-comparison of the bridge voltages $U_A$, $U_B$. As is shown in FIG. 1a, three strain gauges are each arranged on different measuring spokes for this bridge circuit. As is shown in the example, DR12 and DR11 are arranged on opposite sides of measuring spoke 1, while DR41 is arranged on measuring spoke 4 and DR22 is arranged on measuring spoke 2. A half bridge is formed by DR11 on measuring spoke 1 with DR22 on measuring spoke 2, with DR22 being arranged on the side of measuring spoke 2 which is opposite the side of measuring spoke 1 on which DR11 is arranged. In other words, DR11 and DR22 are arranged on adjacent measuring spokes and specifically on opposite sides of the adjacent measuring spokes. This applies analogously for DR12 and DR41.

Figure is shows the connection of the second bridge circuit, which supplies the second bridge voltage $U_B$ for the cross-comparison with the bridge voltage of the first bridge circuit $U_A$. The connection of the bridge circuit is similar to the first bridge circuit shown in FIG. 1b.

As is shown in FIG. 1a, in the second bridge circuit too, three strain gauges are arranged on different measuring spokes. In this case, DR32 and DR31 are arranged on measuring spoke 3, while DR42 is arranged on measuring spoke 4 and DR21 is arranged on measuring spoke 2. A half bridge is formed by the resistors of DR32 on measuring spoke 3 with DR21 on measuring spoke 2, with DR21 on measuring spoke 2 being arranged on the opposite measuring spoke side of DR32 on measuring spoke 3. The second half bridge is formed by the resistors of DR31 on measuring spoke 3 and DR42 on measuring spoke 4.

FIG. 2a shows a view of a schematic representation of the measuring spokes with, arranged thereon, strain gauges and measurement devices for determining the bridge voltage according to a second embodiment. In the second embodiment, the two strain gauges DR11, DR32 on the opposite measuring spokes 1 and 3 are connected to form a half bridge and the two strain gauges DR22, DR41 on the two other opposite measuring spokes 2 and 4 are connected to form a second half bridge.

FIG. 2b shows the first bridge circuit which supplies the first bridge voltage $U_A$ for a cross-comparison of the bridge voltages $U_A$, $U_B$. As shown in FIG. 2b, four strain gauges are arranged on different measuring spokes in the first bridge circuit. In the depicted embodiment, DR11 is arranged on measuring spoke 1, DR32 on measuring spoke 3, DR22 on measuring spoke 2 and DR41 on measuring spoke 4.

A half bridge is formed by the resistors of DR11 on measuring spoke 1 with DR32 on the opposite measuring spoke 3. The second half bridge is formed by DR22 on measuring spoke 2 and DR41 on measuring spoke 4.

FIG. 2c shows the connection of the second bridge circuit, which supplies the second bridge voltage $U_B$ for the cross-comparison with the bridge voltage of the first bridge voltage $U_A$. The connection of the bridge circuit is similar to the first bridge circuit shown in FIG. 2b.

As shown in FIG. 2a, DR21 is arranged on measuring spoke 2, DR42 on measuring spoke 4, DR12 on measuring spoke 1 and DR31 on measuring spoke 3.

The embodiment shown in FIG. 2, in which all four strain gauges in each bridge circuit are arranged on different spokes 1, 2, 3, 4 of the torque sensor 10, has the advantage that a deformation of the measuring spokes apart from the torque load, as described above by means of compression of the measuring spokes, for example, and by transverse forces, axial forces or bending moments acting on the inner measuring hub 12 of the torque sensor 10, is largely compensated because strain gauges on each measuring spoke are connected in both bridge circuits. In the subsequent cross-comparison of the two bridge voltages, it is possible to determine a "more precise" and "more reliable" measured value. It is also possible to select a smaller margin of error for detecting that a "genuine" error exists.

FIG. 3 shows a schematic depiction of the measuring spokes 1, 2, 3, 4 with, arranged thereon, strain gauges and measurement devices for determining the bridge voltage according to a third embodiment. This embodiment is an alternative to the one shown in FIG. 2 in which, in each of the at least two bridge circuits, four strain gauges are also arranged on different measuring spokes of the torque sensor 10.

FIG. 3a shows that two strain gauges DR11, DR22 on adjacent measuring spokes 1, 2 are connected in a first half bridge and the resistors of two strain gauges DR32, DR41 on other adjacent measuring spokes 3, 4 are connected in a second half bridge.

FIG. 3b shows the first bridge circuit, which supplies the first bridge voltage $U_A$ for a cross-comparison of the bridge voltages $U_A$, $U_B$. As shown in FIG. 3b, four strain gauges are arranged on different measuring spokes in the first bridge circuit. In the depicted embodiment, DR11 is arranged on measuring spoke 1, DR22 on measuring spoke 2, DR32 on measuring spoke 3 and DR41 on measuring spoke 4.

A half bridge is formed by the resistors of DR11 on measuring spoke 1 with DR22 on measuring spoke 2, wherein DR11 on measuring spoke 1 is arranged on the opposite measuring spoke side of DR22 on measuring spoke 2. In other words, DR11 is arranged on measuring spoke 1 on the side of measuring spoke 1 which is opposite the side of DR22. The second half bridge is formed by the resistors of DR32 on measuring spoke 3 and DR41 on measuring spoke 4.

FIG. 3c shows the connection of the second bridge circuit, which supplies the second bridge voltage $U_B$ for the cross-comparison with the bridge voltage of the first bridge circuit $U_A$. The connection of the bridge circuit is similar to the first bridge circuit shown in FIG. 3b.

As shown in FIG. 3a, DR12 is arranged on measuring spoke 1, DR21 on measuring spoke 2, DR31 on measuring spoke 3 and DR42 on measuring spoke 4.

A half bridge of the second bridge circuit is formed by the resistors of DR12 on measuring spoke 1 with DR21 on measuring spoke 2, wherein DR12 on measuring spoke 1 is arranged on the opposite measuring spoke side of DR21 on measuring spoke 2. The second half bridge is formed by DR31 on measuring spoke 3, which is opposite DR12, and DR42 on measuring spoke 4, with DR31 being located on the opposite measuring spoke side of DR42.

The circuits shown in FIGS. 2 and 3 differ essentially only in the connection of the strain gauges in the bridge circuits. Both figures show embodiments in which four strain gauges are arranged on all four measuring spokes. A decision for or against one of these alternatives depends, for example, on the availability of the bridge supply or the dimensions in the circuit layout.

The invention claimed is:

1. A torque sensor for detecting a torque occurring on or in a joint of an articulated-arm robot, comprising:
   a plurality of measuring spokes including four spokes arranged in a radial array and configured to deform under the effects of the torque applied to said torque sensor, wherein each of the four spokes in the array is positioned adjacently to two other spokes in the array and opposite to another spoke in the array;
   a plurality of strain gauges, wherein at least two of the plurality of strain gauges are arranged on opposite side surfaces of each of the plurality of measuring spokes between each spoke and one of the adjacent spokes, whereby for each of the plurality of measuring spokes, one of the opposite sides is stretched and the other of the opposite sides is compressed under the effects of the torque applied to said torque sensor; and
   at least two bridge circuits, each of the two bridge circuits comprising two parallel voltage dividers forming half bridge circuits, each half bridge circuit including two of the plurality of strain gauges arranged on the measuring spokes and having an output positioned between the two strain gauges, the two outputs of each bridge circuit configured for providing a measurable bridge voltage signal,
   wherein in each of the at least two bridge circuits, each of the strain gauges included in the half bridge circuits of the bridge circuit is arranged on a different one of the four measuring spokes,
   wherein the two strain gauges included in each half bridge circuit are arranged on adjacent ones of the spokes, and
   wherein measurement errors in the detected torque are detected by a cross-comparison of the bridge voltage signals of the at least two bridge circuits.

2. The torque sensor according to claim 1, wherein the torque sensor is formed as a spoke sensor including an outer ring and one of an inner ring or hub, and the plurality of measuring spokes interconnect the outer ring and the inner ring or hub.

3. The torque sensor according to claim 1, wherein the two strain gauges positioned around the output of the half bridge circuit in each bridge circuit are respectively positioned so that one of the strain gauges is stretched and the other strain gauge is compressed under the effects of the torque applied to said torque sensor.

4. The torque sensor according to claim 1, wherein for two of the strain gauges in each bridge circuit positioned between the outputs of the half bridge circuits and a voltage source, one of the opposite sides is stretched and the other of the opposite sides is compressed under the effects of the torque applied to said torque sensor.

5. The torque sensor according to claim 1, wherein for two of the strain gauges in each bridge circuit positioned between the outputs of the half bridge circuits and a ground, one of the opposite sides is stretched and the other of the opposite sides is compressed under the effects of the torque applied to said torque sensor.

6. A method for detecting a torque with a torque sensor, the torque occurring on or in a joint of an articulated-arm robot, and said method comprising the steps of:
   providing said torque sensor with:
      a plurality of measuring spokes including four spokes arranged in a radial array and configured to deform under the effects of the torque applied to said torque sensor, wherein each of the four spokes in the array is positioned adjacently to two other spokes in the array and opposite to another spoke in the array,
      a plurality of strain gauges, wherein two of the plurality of strain gauges are arranged on opposite side surfaces of each of the plurality of measuring spokes between each spoke and one of the adjacent spokes, whereby for each of the plurality of measuring spokes, one of the opposite sides is stretched and the other of the opposite sides is compressed under the effects of the torque applied to said torque sensor, and
      at least two bridge circuits, each of the two bridge circuits comprising two parallel voltage dividers forming half bridge circuits, each half bridge circuit including two of the plurality of strain gauges arranged on the measuring spokes and having an output positioned between the least two strain gauges, the two outputs of each bridge circuit configured for providing a measurable bridge voltage signal, wherein in each of the at least two bridge circuits, each of the strain gauges included in the half bridge circuits of the bridge circuit is arranged on a different one of the four measuring spokes, and wherein the two strain gauges included in each bridge circuit are arranged on adjacent ones of the spokes;

detecting bridge voltage signals generated by the at least two bridge circuits; and comparing the detected bridge voltage signals generated by the at least two bridge circuits to determine whether the detected bridge voltage signals are reliable.

7. An articulated-arm robot comprising:

at least one robot arm;

a joint connecting said at least one robot arm to a component of the robot; and a torque sensor for detecting a torque occurring on or in the joint; said torque sensor comprising a plurality of measuring spokes including four spokes arranged in a radial array and configured to deform under the effects of the torque applied to said torque sensor wherein each of the four spokes in the array is positioned adjacently to two other spokes in the array and opposite to another spoke in the array, a plurality of strain gauges, wherein two of the plurality of strain gauges are arranged on opposite side surfaces of each of the plurality of measuring spokes between each spoke and one of the adjacent spokes, whereby for each of the plurality of measuring spokes, one of the opposite sides is stretched and the other of the opposite sides is compressed under the effects of the torque applied to said torque sensor, and at least two bridge circuits, each of the two bridge circuits comprising two parallel voltage dividers forming half bridge circuits, each half bridge circuit including two of the plurality of strain gauges arranged on the measuring spokes and having an output positioned between the two strain gauges, the two outputs of each bridge circuit configured for providing a measurable bridge voltage signal, wherein in each of the at least two bridge circuits, each of the strain gauges included in the half bridge circuits of the bridge circuit is arranged on a different one of the four measuring spokes, wherein the two strain gauges included in each half bridge circuit are arranged on adjacent ones of the spokes, and wherein measurement errors in the detected torque are detected by a cross-comparison of the bridge voltage signals of the at least two bridge circuits.

8. The robot according to claim 7, wherein the two strain gauges positioned around the output of half bridge circuit in each bridge circuit are respectively portioned so that one of the strain gauges is stretched and the other strain gauge is compressed under the effects of the torque applied to said torque sensor.

9. The robot according to claim 7, wherein for two of the strain gauges in each bridge circuit positioned between the outputs of the half bridge circuits and a voltage source, one of the opposite sides is stretched and the other of the opposite sides is compressed under the effects of the torque applied to said torque sensor.

10. The robot according to claim 7, wherein for two of the strain gauges in each bridge circuit positioned between the outputs of the half bridge circuits and a ground, one of the opposite sides is stretched and the other of the opposite sides is compressed under the effects of the torque applied to said torque sensor.

* * * * *